US008702393B2

(12) United States Patent
Al-Azzawi

(10) Patent No.: US 8,702,393 B2
(45) Date of Patent: Apr. 22, 2014

(54) BLINKING SAIL WINDMILL WITH SAFETY CONTROL

(76) Inventor: Jasim Saleh Al-Azzawi, Dubai (AE)

( * ) Notice: Subject to any disclaimer, the term of this patent is extended or adjusted under 35 U.S.C. 154(b) by 843 days.

(21) Appl. No.: 12/860,865

(22) Filed: Aug. 21, 2010

(65) Prior Publication Data

US 2012/0045333 A1  Feb. 23, 2012

(51) Int. Cl.
*F03D 7/06* (2006.01)
*F03D 3/00* (2006.01)

(52) U.S. Cl.
USPC ................ 416/132 A; 416/132 B; 416/142

(58) Field of Classification Search
USPC .......... 416/131, 132 R, 132 B, 135, 137, 139, 416/140, 142, 143, 37; 415/4.2, 4.4
See application file for complete search history.

(56) References Cited

U.S. PATENT DOCUMENTS

| | | | |
|---|---|---|---|
| 1,286,853 A | 12/1918 | Weaver | |
| 3,920,354 A | 11/1975 | Decker | |
| 4,113,408 A * | 9/1978 | Wurtz et al. | 416/17 |
| 4,191,507 A * | 3/1980 | DeBerg | 416/117 |
| 4,346,305 A * | 8/1982 | White | 290/55 |
| 4,365,935 A | 12/1982 | Zukeran | |
| 4,649,284 A | 3/1987 | Hsech-Pen | |
| 4,684,817 A * | 8/1987 | Goldwater | 290/55 |
| 5,256,034 A * | 10/1993 | Sultzbaugh | 416/91 |
| 5,525,037 A * | 6/1996 | Cummings | 416/117 |
| 5,951,249 A * | 9/1999 | Aylor | 416/42 |
| 7,077,628 B1 * | 7/2006 | Acord | 416/1 |
| 7,875,990 B2 * | 1/2011 | Wang et al. | 290/43 |
| 8,157,501 B2 * | 4/2012 | Semov | 415/4.2 |
| 2003/0231951 A1 * | 12/2003 | Kaare et al. | 415/4.2 |
| 2004/0258524 A1 * | 12/2004 | Jang | 416/132 B |
| 2008/0203731 A1 * | 8/2008 | Dulcetti Filho | 290/44 |
| 2008/0217924 A1 * | 9/2008 | Boone | 290/55 |
| 2008/0267776 A1 | 10/2008 | Al-Azzawi | |
| 2009/0092490 A1 * | 4/2009 | Brooks | 416/24 |
| 2009/0180880 A1 * | 7/2009 | Ersoy | 416/132 R |

FOREIGN PATENT DOCUMENTS

WO   WO2006/084415   *   8/2006   .............. F03B 13/00

* cited by examiner

*Primary Examiner* — Edward Landrum
*Assistant Examiner* — Joshua R Beebe
(74) *Attorney, Agent, or Firm* — Moore Patents; David Dreyfuss

(57) ABSTRACT

A vertical axis windmill is disclosed which includes a set of frames attached via horizontal bars to a vertical axis of rotation, each frame comprising a plurality of swinging windows, each swinging window comprising an upper horizontal bar, vertical side bars, and a plurality of additional horizontal bars; a plurality of blinking sails comprising sheets of lightweight material, wherein the upper edge of each blinking sail is fixed at a horizontal bar, each blinking sail being allowed to move by pivoting or bending relative to the horizontal bar; a gap control rod for each of the frames, connected to each of the swinging windows in the frame such that all swinging windows in the frame move synchronously as the gap control rod is moved; and one or more electronically controlled actuators capable of moving the gap control rods. The swinging windows stop the blinking sails from being blown to one side of the frames, where that one side is on the same side of each frame relative to the direction of rotation of the vertical axis windmill. The swinging windows are movable toward that same side of the frame such that there is a variable gap to allow part of the air to pass through in the downwind direction. The electronically controlled actuators can be programmed to respond to available sensors including sensors for wind speed, wind direction, swinging window position, and windmill power output.

12 Claims, 11 Drawing Sheets

BLINKING SAIL WINDMILL WITH SAFETY CONTROL

FIELD OF THE INVENTION

This invention relates generally to vertical axis windmills.

BACKGROUND

Windmills have the potential to provide cheap energy on a global scale, to raise the standard of living of poor communities, and to contribute significantly to the reduction of global warming. People all over the world can benefit from the use of electricity generated by windmills for heating homes, lighting and other household activities.

Large fields of windmills are capable of supplying big cities and entire regions with electricity. The electricity, in turn, can also be used to charge batteries used to power electric vehicles or to generate hydrogen gas to be used by vehicles.

Vertical axis windmills can be scaled to very large sizes that can generate more electrical power than other windmill designs. They can also have a very low cost of manufacture and can be built from lightweight low-cost materials. They can also generate electricity even if the speed of wind is extremely low or almost at a standstill when other common windmill designs are unable to generate power at all. They are omnidirectional in the sense that they do not have to be oriented relative to the wind and can operate equally well for any wind direction or indeed under conditions of rapidly changing wind direction. Various designs for vertical axis windmills have been proposed including that disclosed in co-pending U.S. patent application Ser. No. 11/790,494, which is incorporated herein by reference, as well as earlier designs by Weaver (U.S. Pat. No. 1,286,853), Decker (U.S. Pat. No. 3,920,354), and Zukeran (U.S. Pat. No. 4,365,935).

An important feature of any useful large vertical axis windmill design is a safety mechanism for overspeed protection in high winds. The above mentioned application and patents disclose various mechanical mechanisms for this purpose. For example, co-pending U.S. patent application Ser. No. 11/790,494 discloses movable horizontal bars that stop a plurality of lightweight sail elements. At low wind speed, these movable horizontal bars block the lightweight sail elements such that the full force of available wind can be brought to bear against the full area of each sail element. As the wind speed increases above a pre-determined threshold, the movable horizontal bars are pushed away from the plane of the main sail frames such that a portion of the wind is allowed to leak through, thereby reducing the amount of force applied to each sail element. A suitable maximum power output can continue to be collected, the windmill structure is protected from damage due to excessive force, and it is not necessary to shut down the windmill, no matter how much the wind speed increases.

Zukeran discloses a different protection mechanism depending solely on gravity. The sail elements are the full size of the frames and are mounted inside weighted frames which can swing in the downwind direction when the wind is fast enough to provide enough deflection force to lift the weights.

SUMMARY OF THE INVENTION

A vertical axis windmill is disclosed which includes a set of frames attached via horizontal bars to a vertical axis of rotation, each frame comprising a plurality of swinging windows, each swinging window comprising an upper horizontal bar, vertical side bars, and a plurality of additional horizontal bars; a plurality of blinking sails comprising sheets of lightweight material, wherein the upper edge of each blinking sail is fixed at a horizontal bar, each blinking sail being allowed to move by pivoting or bending relative to the horizontal bar; a gap control rod for each of the frames, connected to each of the swinging windows in the frame such that all swinging windows in the frame move synchronously as the gap control rod is moved; and one or more electronically controlled actuators capable of moving the gap control rods. The swinging windows stop the blinking sails from being blown to one side of the frames, where that one side is on the same side of each frame relative to the direction of rotation of the vertical axis windmill. The swinging windows are movable toward that same side of the frame such that there is a variable gap to allow part of the air to pass through in the downwind direction. The electronically controlled actuators can be programmed to respond to available sensors including sensors for wind speed, wind direction, swinging window position, and windmill power output.

BRIEF DESCRIPTION OF THE DRAWINGS

Explanation of symbols used in Drawings.
A: Central vertical post of the windmill
B: Frame of windmill
C: sheet of light weight material
D: Concrete foundation
E: Strong steel wire
F: swinging windows extension
G: Support beam for the wire
H: Direction of wind
J: Rotation direction of windmill
K: Ball bearing on which the frames are fixed
L: Swinging window on which sheets of light weight material are hung
M: gap control rod
N: actuator which controls the gap
P: Linear bearing which connects a central actuator to the gap control rods
Q: horizontal frame bar

DETAILED DESCRIPTION

Figure 1:
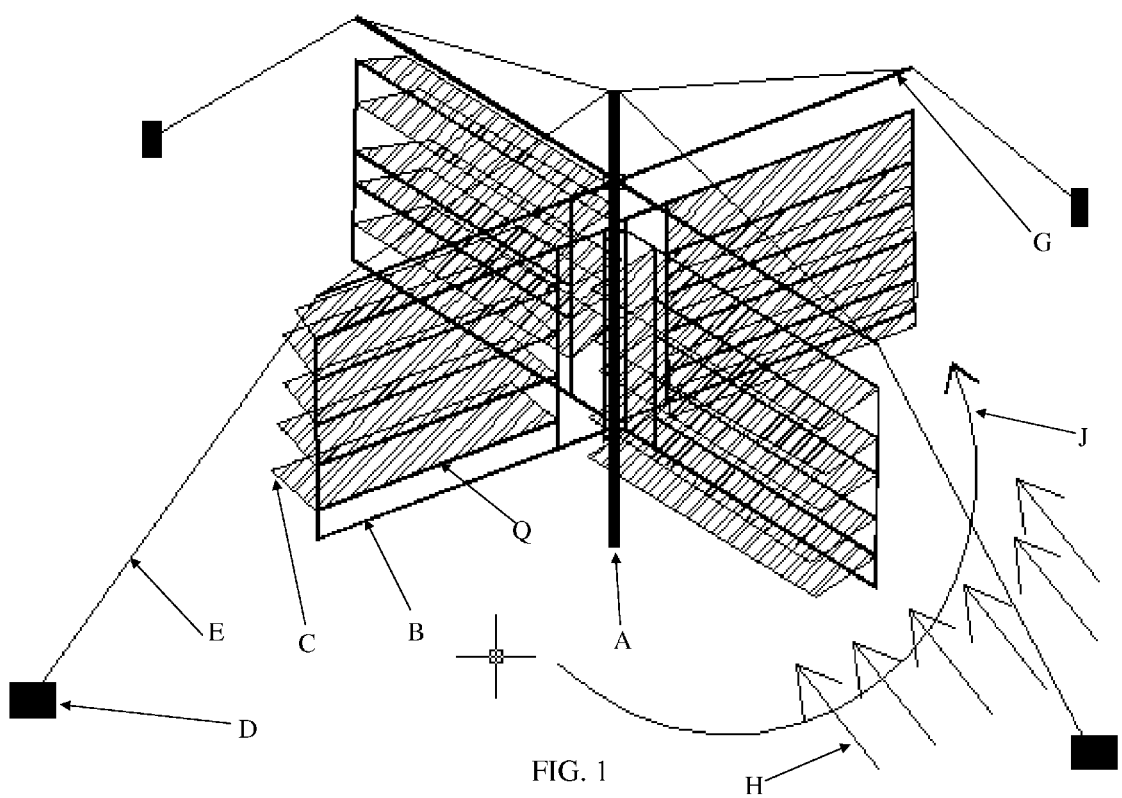
FIG. 1 shows the main parts of a typical vertical axis windmill with blinking sails.

A vertical axis windmill is disclosed. The windmill comprises a set of vertical frames each of which contains a set of blinking sails which open and close as the frames rotate about a central vertical axis such that the wind is preferentially caught on one side of the windmill and allowed to pass through on the other side. FIG. 1 shows an example having a plurality of large frames (B) (typically 3-5; 4 are shown in FIG. 1) connected via horizontal support bars to a central vertical post (A) on the vertical axis. The central vertical post is supported by suitable bearings at the top and bottom (not shown) to permit free rotational movement of the central support with attached large frames. A concrete foundation (D) is used to hold the windmill in position against strong winds with the aid of strong steel wires (E) which connect the upper support for the central post (A) to the concrete foundation (D) via the support beam (G).

The overall size of the windmill can vary according to power generation needs. The frames may be made of any common structural material such as steel or aluminum. For small windmills used by single houses to generate electricity for household or other small-scale uses, wood or plastic can be suitable, and simpler support structures can be adequate. For industrial and commercial scale power generation, a blinking sail windmill can readily be scaled up to frame sizes of 15 meters or more, both vertically and horizontally.

Each large frame comprises a plurality of "blinking sails" (C) which are hung from upper horizontal bars (Q) and allowed to pivot from those upper horizontal bars (Q). As shown, each blinking sail (C) comprises a sheet of lightweight material such as cloth or aluminum. The material is shown as opaque, although it need not necessary be so.

The wind direction (H) is shown so that the response of the blinking sails can be illustrated by example. For the leftmost frame in FIG. 1, the blinking sails (C) are blown away from the frame (B) so that the wind can pass freely through the frame (B). This is the "blink" mode of the sail. Simultaneously, for the rightmost frame in FIG. 1, the blinking sails (C) are stopped against the frame (B) by lower horizontal bars, preventing the wind from passing through and ensuring that the entire frame will act as a single large sheet of sail. The lower horizontal bars can, in general, be separate elements from the upper horizontal bars, although in the example of FIG. 1, where there is another blinking sail element immediately below, then the upper horizontal bar of the lower element serves as the lower horizontal bar for the blinking sail above it. The vertical size of each blinking sail is larger than the vertical spacing between horizontal bars so that each blinking sail is confined to pivot in one direction only relative to the frame (B); i.e., it can blow away from the frame in the downwind direction, but is stopped against the frame in the upwind direction. At intermediate frame positions where the wind is blowing at an angle relative to frame, then the blinking sails will assume a position somewhere between the two extreme positions just described according to the angle, the speed of the wind, and the weight of the sail (which tends to keep the sail against the frame in the absence of wind).

The direction of rotation (J) of the windmill as shown in FIG. 1 is counterclockwise as viewed from above, because the blinking sails (C) on the right-hand frame are closed while those on the left-hand frame are open. For a windmill with four frames, depending on the rotational orientation of the frames, typically two frames are being driven by the wind, and two are allowing the wind to pass through at any given time. The direction of rotation can be reversed by reversing to which side of the swinging windows the blinking sails are attached.

Co-pending U.S. patent application Ser. No. 11/790,494 discloses a safety mechanism to protect against excessive wind speeds wherein separate and movable lower horizontal bars are provided. These movable lower horizontal bars are confined to move only on the same side of each frame as the blinking sails and are held in the plane of the frame at low wind speeds via side arms and spiral springs.

Figure 4:
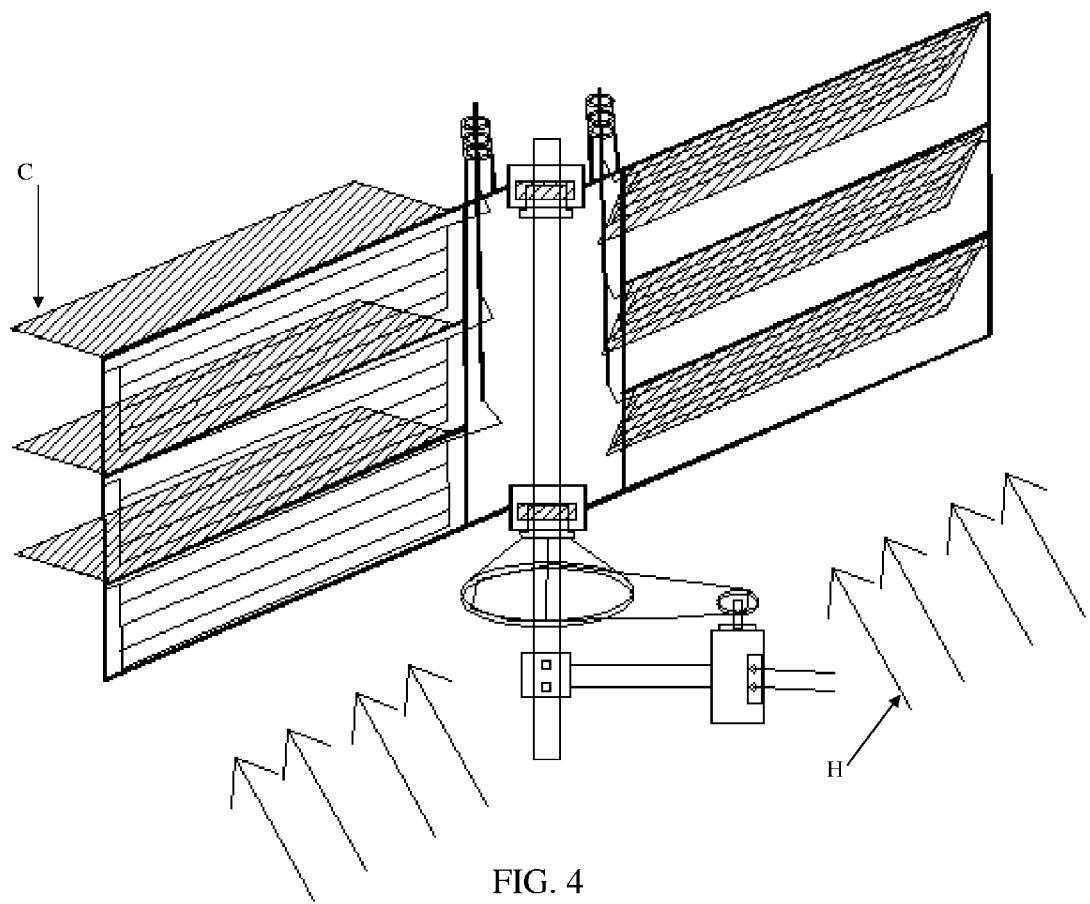
FIG. 4 is the same as FIG. 2 with the blinking sails added. High wind protection is activated via the actuator mechanism on the right-hand frame.
Figure 5:
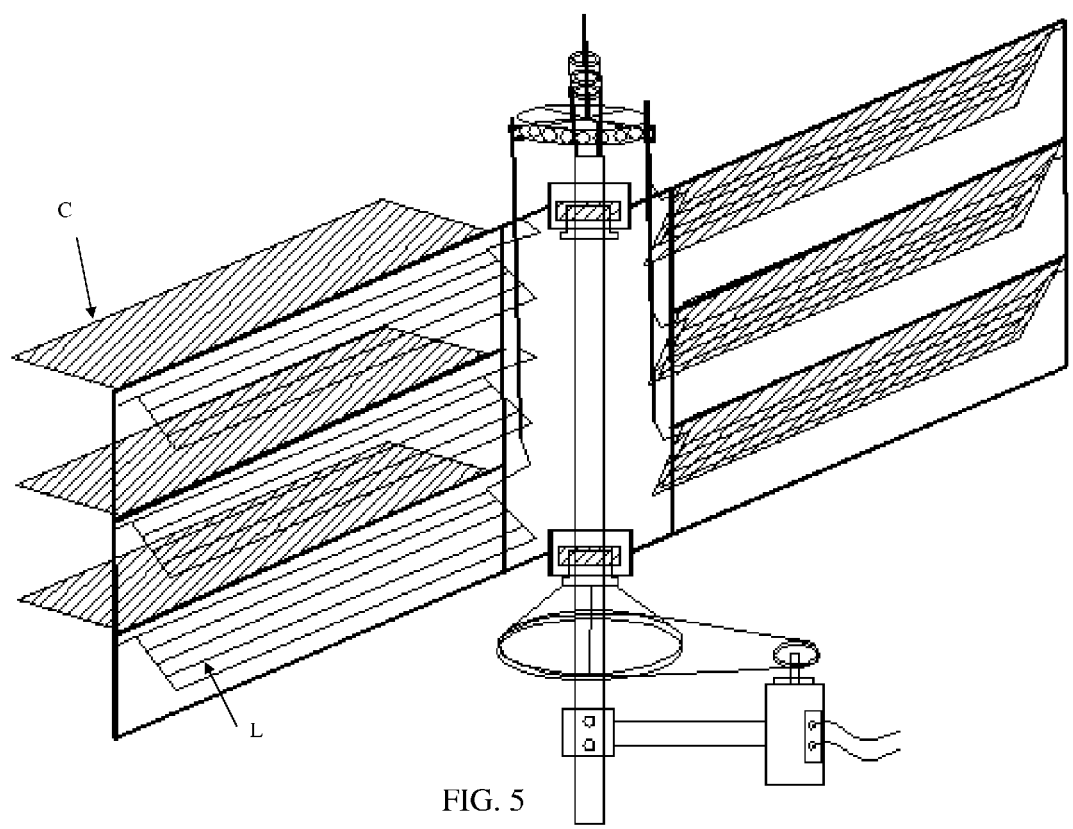
FIG. 5 is the same as FIG. 3 with the blinking sails added.
Figure 6:
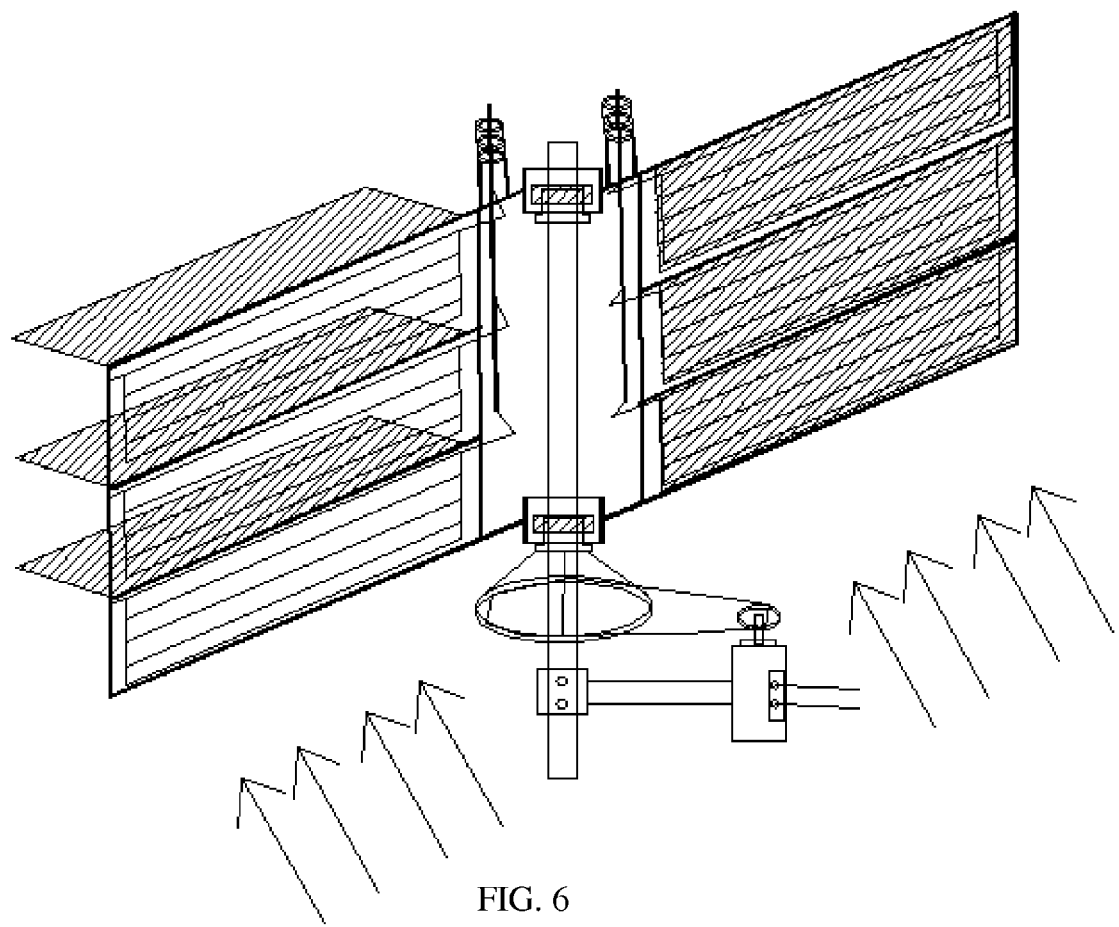
FIG. 6 shows blinking sail windmill operation when the wind is slow or normal speed. The actuator for the swinging windows has not been activated.
Figure 7:
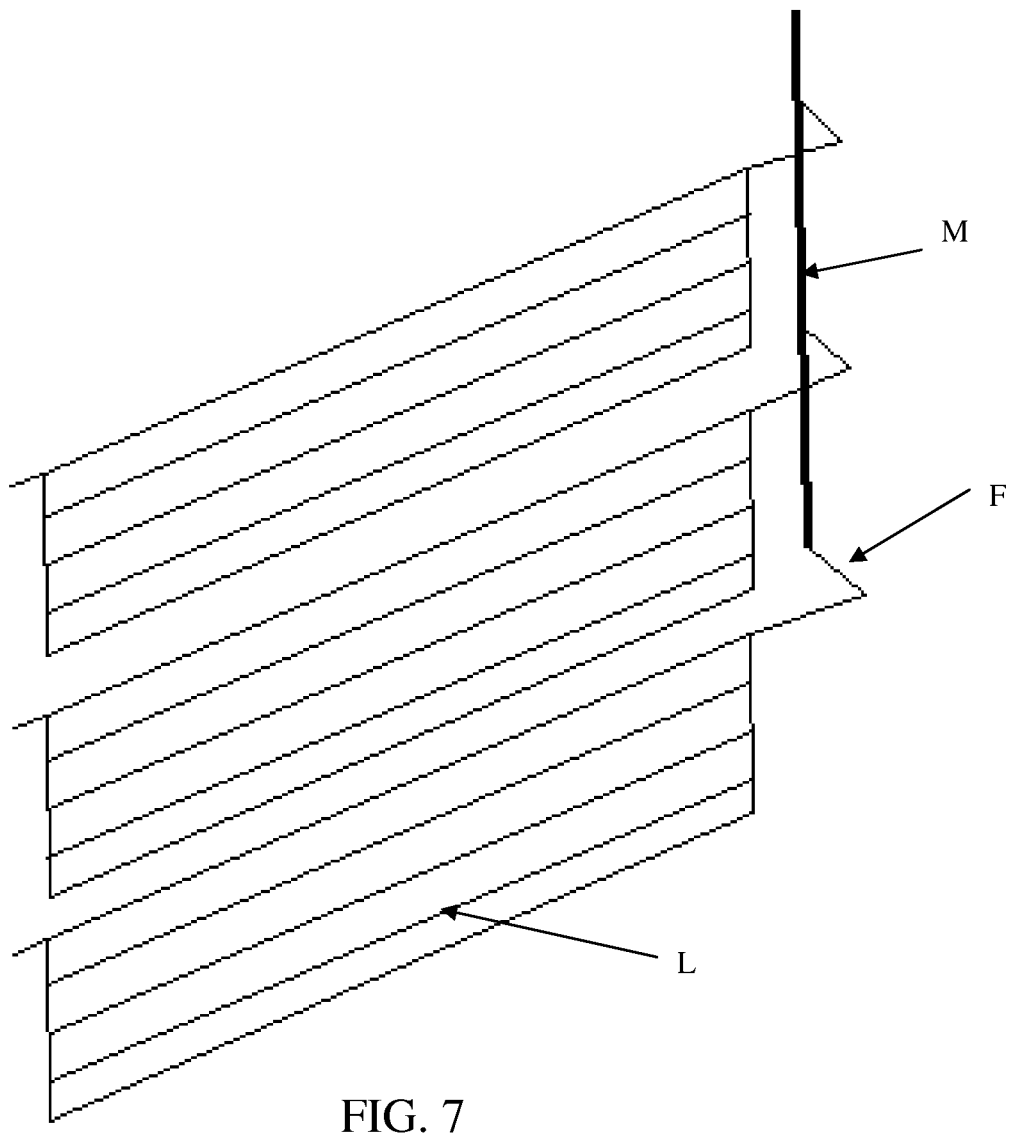
FIG. 7 shows three swinging windows connected to a gap control rod.
Figure 8:
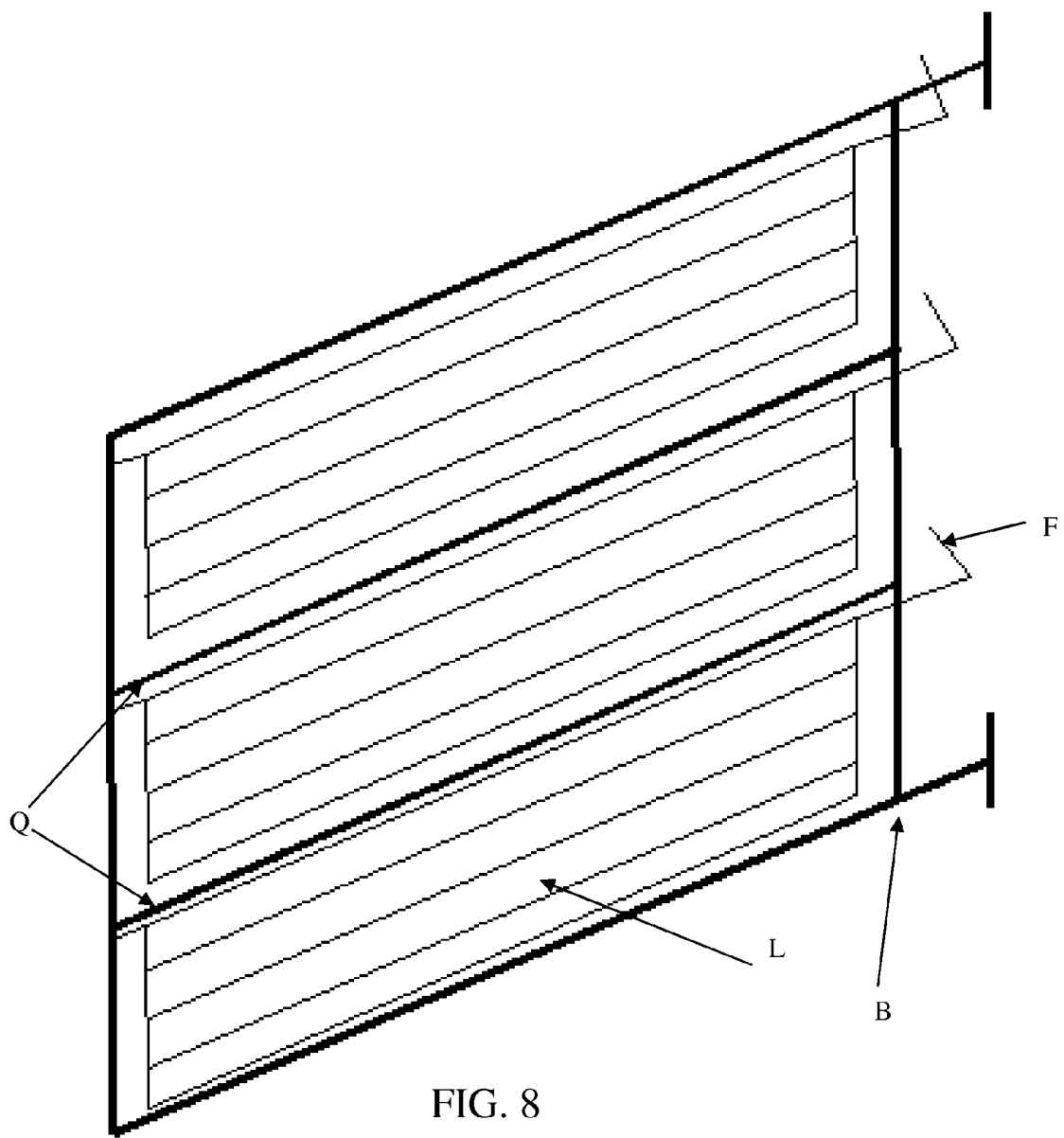
FIG. 8 shows one frame where three swinging windows are fixed in position on the frame.
Figure 9:
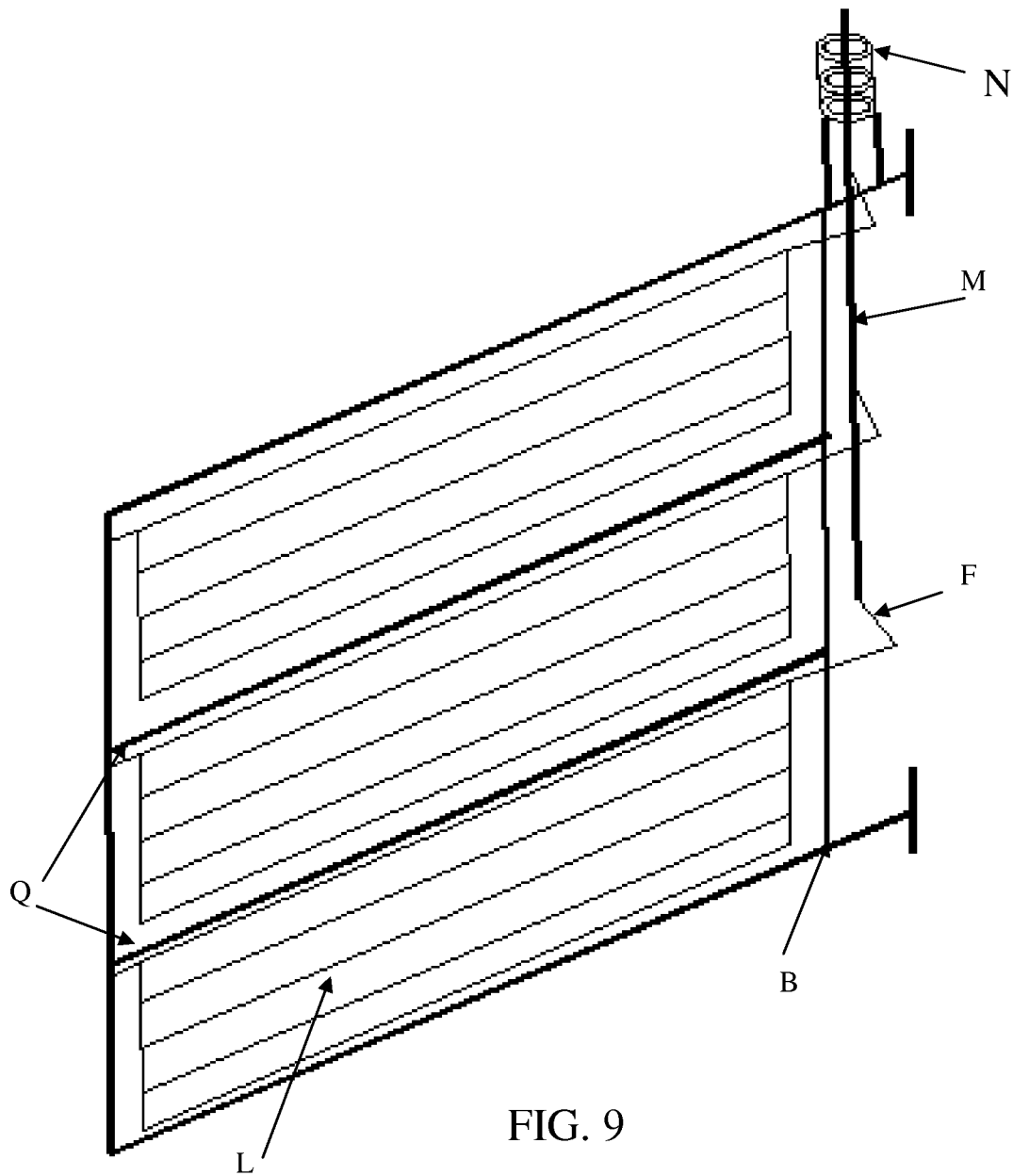
FIG. 9 is the same as FIG. 8 with added gap control rod and actuator mechanism.
Figure 10:
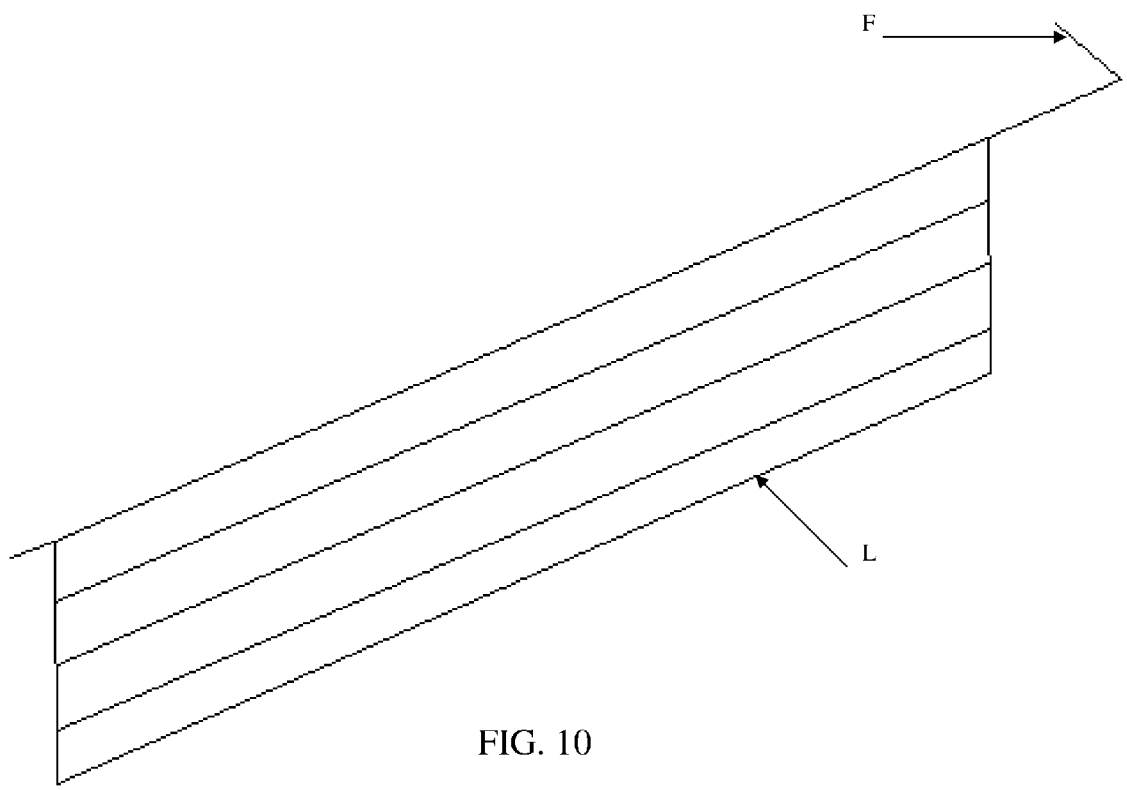
FIG. 10 shows one swinging window and the extension by which it connects to the gap control rod.
Figure 11:
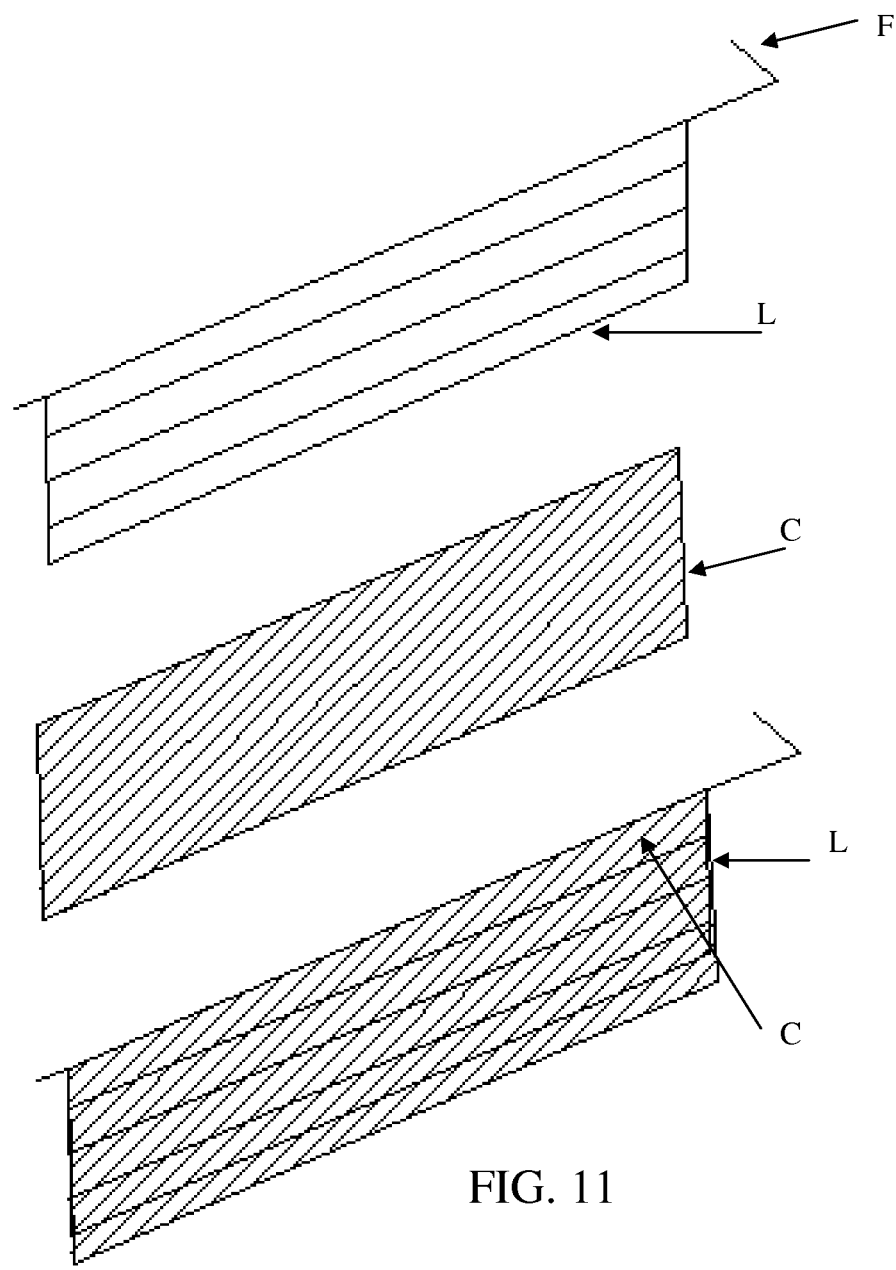
FIG. 11 shows the swinging window (top) and the blinking sail (middle) and the blinking sail attached to the swinging window (bottom).

In accordance with one or more embodiments of the present invention, the safety mechanism described above is replaced with a mechanism that uses linear control rods to move "swinging windows" (L) to provide controlled air leakage under high wind conditions as shown in FIGS. 4 and 5. FIG. 6 shows the same configuration as FIG. 4 under lower wind conditions where the safety mechanism is not active. A swinging window (L) comprises side arms, upper and lower horizontal bars and one or more additional horizontal bars between the side arms. The swinging window is mounted so as to pivot about the upper horizontal bar. Optionally, additional vertical bars (not shown) can also be provided. Blinking sails are attached to the upper horizontal bar of the swinging window on the upwind side as shown in FIGS. 4, 5, 6, and 11. Alternatively, the blinking sails can be attached to fixed horizontal frame bars (Q); either attachment point provides essentially similar functionality. When the blinking sails are attached to the upper horizontal bar of the swinging window, some or all of the fixed horizontal bars (Q) can be omitted if not needed to provide structural stiffness for frames (B).

The additional bar or bars in the swinging windows provide additional stops for the blinking sails and allow the use of blinking sails that have the same area as the swinging windows. (Without the additional bar or bars, the sails must be slightly longer in the vertical direction so that the lower bars can stop the sails.) The blinking sails can also be lighter weight than would be required to function properly with a single lower horizontal bar design, and they require only sufficient stiffness so that the strongest wind cannot cause the sail material to buckle and pass through an open area in the swinging window.

The blinking sails can be made of cloth or other lightweight material such as plastic or aluminum. The sail weight and size should be selected so that a very weak wind can deflect the blinking sails away from the frame.

In certain embodiments, all the swinging windows are connected to "gap control rods" (M), and an actuator device or devices (N) is provided to control the motion of the swinging windows (L) via the gap control rods (M). In other embodiments, each swinging window is provided with its own actuator device, and no gap control rods are required.

Many possible configurations of actuator devices are possible within the scope of the invention, and many possible actuators can be used. Possible actuators include springs such as but not limited to extension or compression springs or leaf springs, electromagnets (both linear and rotary solenoids), motor-driven leadscrews or ballscrews, pneumatics (air cylinders), hydraulic cylinders, and linear motors. The only requirement is that the actuator be capable of providing controlled movement of one or more swinging windows and holding a desired position in the presence of wind of a particular speed.

In accordance with one or more embodiments of the present invention, extension or compression springs are attached to gap control rods (M) so that when the wind pushes a blinking sail against a swinging window, the swinging window will move and push the gap control rod upward against a spring (in either extension or compression). As the wind speed increases, the swinging window open further and the spring is compressed or extended further until the swinging window is fully open. The windmill is thereby protected against excessive force and excessive power output at all wind speeds.

In accordance with one or more embodiments of the present invention, an electronic mechanism comprising a wind speed sensor and an electrically controllable actuator is used to move the gap control rods (M). Various specific sensors and actuators can be used. The actuators can be also used with the movable lower horizontal bars of co-pending U.S. patent application Ser. No. 11/790,494. The examples presented here incorporate the swinging window configuration.

For concreteness, examples are illustrated using electromagnetic actuators, although other actuators can be freely substituted.

In accordance with one or more embodiments of the present invention, a separate actuator is provided for each swinging window. This option requires a plurality of actuators, but each actuator need only be capable of supporting the forces on a single swinging gate with its associated blinking sail.

Figure 2:
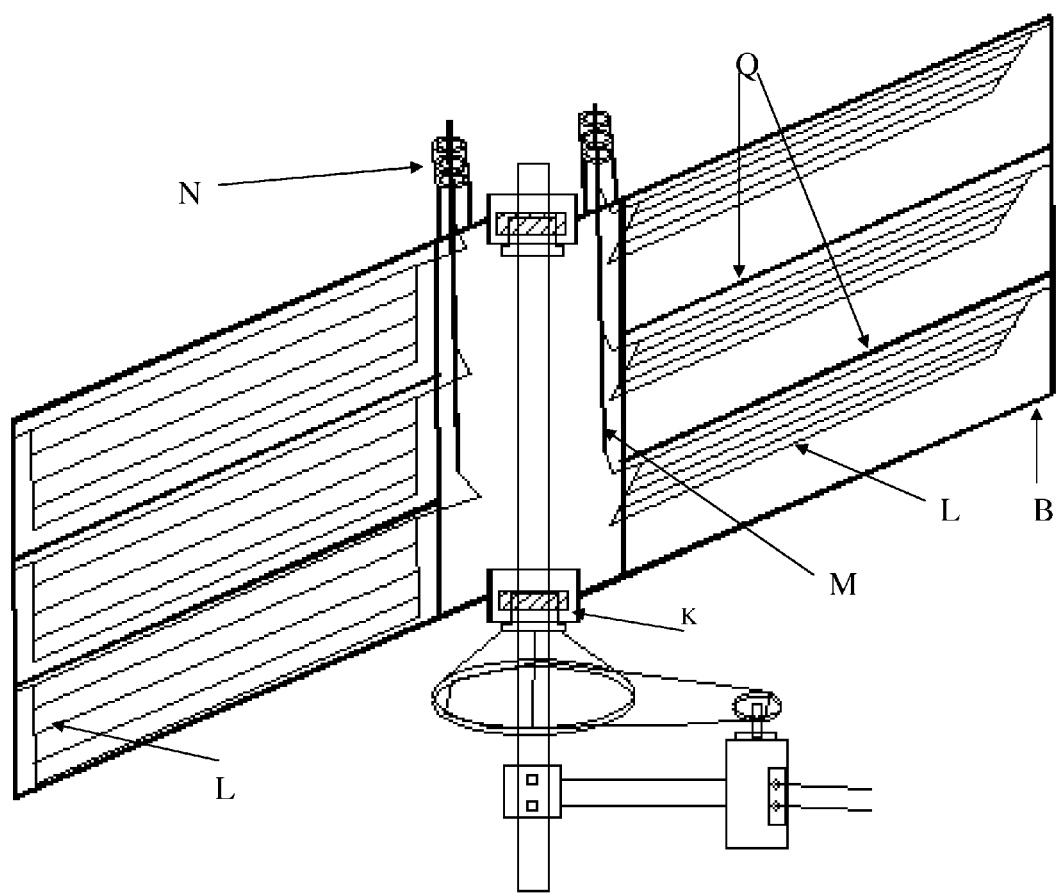
FIG. 2 shows only two frames of the windmill with swinging windows and an actuator mechanism for each frame. The blinking sails are omitted.

In accordance with one or more embodiments of the present invention, for each frame, one actuator is used to control the gaps of all the swinging windows (L) of a particular frame, as shown in FIG. 2. The actuator moves and holds the gap control rod (M) to control the motion of all the swinging windows and therefore the safety gaps of an entire frame. FIG. 2 shows a view with the blinking sails not shown and operating under wind speeds above the threshold where the actuators are active and controlled air leakage is provided; FIG. 4 shows the same view with the blinking sails present.

Figure 3:
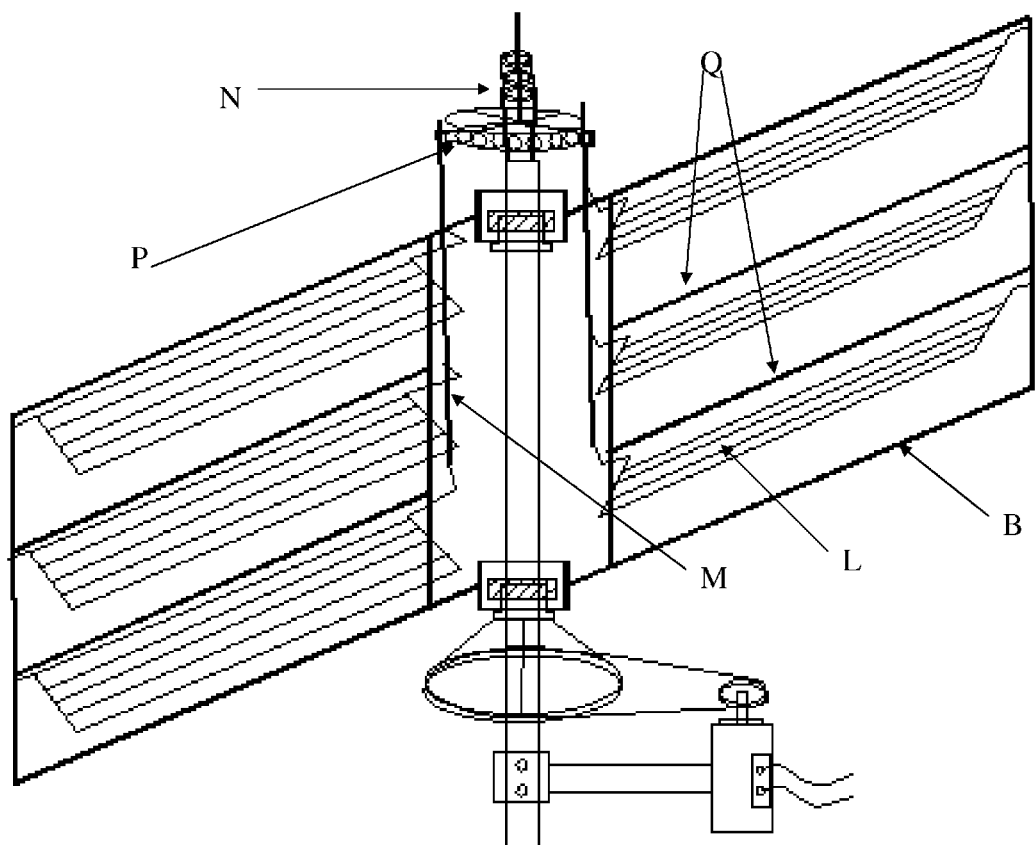
FIG. 3 shows only two frames of the windmill with swinging windows and a single actuator mechanism for all frames. The actuator is shown activated. The blinking sails are omitted.

In accordance with one or more embodiments of the present invention, one actuator is used to control the gaps of all the swinging windows of all the frames as shown in FIG. 3. A central actuator (N) is fixed at the top of the windmill and controls the gap control rods (M) through a linear bearing (P) surrounding the central vertical post (A) to control the safety gaps of all swinging windows in all frames. FIG. 5 shows the same view with the blinking sails present and operating under wind speeds above the threshold where the actuators are active and controlled air leakage is provided.

Each swinging window has an extension (F) coming out of it (shown at 90°, although this angle can be less than 90° as shown in FIGS. 7-11. The gap control rod (M) is connected to all these extensions, and the end of the rod is connected to the actuator so that all swinging windows in a frame open together.

In accordance with one or more embodiments of the present invention, a wind speed meter (anemometer) is provided to measure the speed of the wind and convert it into an electrical signal. Any anemometer capable of providing a digital or analog electrical signal related to wind speed can be used. Examples include cup anemometers, windmill anemometers, hot-wire anemometers, laser doppler anemometers, ultrasonic anemometers, deflecting ball anemometers, pressure plate anemometers, and pitot tube anemometers. An electronic controller is provided which can read the signal from the anemometer and control the actuator to produce an appropriate safety gap suitable for the measured wind speed so as to keep the windmill safe under all wind speed conditions. The actuator should be capable of holding the swinging window at any of several set positions, or it can be provide for a continuously variable position to provide controlled air leakage. The details of how a position is set and held will vary according to the choice of actuator as would be familiar to one of skill in the art in using each actuator.

In accordance with one or more embodiments of the present invention, and depending on the choice of actuator, a position encoding sensor can be included to monitor the actual deflection of the swinging windows. Such a position encoder can monitor either the rotational orientation of one or more swinging windows, or the extension of one or more gap control rods. The position information can be used to set and control the size of the gap, especially for actuators (such as, for example, solenoids) which may not provide adequate precision of control.

In accordance with one or more embodiments of the present invention, a wind direction meter is also provided to measure the direction of the wind and convert it into an electrical signal. The electronic controller can use the direction information to selectively activate the actuators for swinging windows only for frames where the blinking sails are currently blocking the wind.

In accordance with one or more embodiments of the present invention, instead of measuring the air speed, the power output of the windmill is monitored via a suitable power sensor. The windmill is protected from high winds by controlling the actuator to limit the maximum power output to a preset value. In further embodiments, both wind speed and power sensors are used as input to the actuator controller to provide safety against both excessive wind (even in the event that power generation is disabled) and excessive power generation (even if the wind speed limit has not been reached).

In accordance with one or more embodiments of the present invention, an electronically controlled actuator can be supplemented with an extension or compression spring configured as described above. In this way, if some fault occurs in the electronic controller or actuator, the spring can still keep the windmill safe in high winds. Typically, the spring can be configured as a backup system, in that the spring would not engage unless the electronically controlled actuator failed to respond.

In accordance with one or more embodiments of the present invention, a safety mechanism can be further provided comprising one or more strong extension or compression springs, normally in tension or compression, to create a safety shutdown mechanism for extremely high speed winds (for example, a Category 4 or 5 hurricane). The safety mechanism further comprises a mechanical trigger mechanism which releases this strong spring when the wind speed reaches a dangerous level. Such a trigger mechanism can, for example, be implemented using a pressure plate or a cup anemometer with a centrifugal governor mechanism. When the mechanism is triggered, the strong spring or springs are released and all swinging windows are rapidly forced wide open (90° to the frame) so that the windmill stops turning altogether. All blinking sails are either held horizontal or allowed to blow to a horizontal position.

The mechanical trigger mechanism can also be provided with a manual release to allow a windmill to be disabled for maintenance. After a storm has passed or maintenance has been completed, the safety mechanism can be reset, either manually (for example, on a small windmill) or with power assist (especially useful on larger windmills), so that normal operation can resume.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A vertical axis windmill comprising a set of frames attached via horizontal bars to a vertical axis of rotation, each frame comprising;
    two vertical side bars, a horizontal top bar, a horizontal bottom bar, and optional additional horizontal frame bars,
    a plurality of swinging windows, each swinging window comprising an upper horizontal bar, vertical side bars, and a plurality of additional horizontal bars;
    a plurality of sheets of lightweight material, wherein the upper edge of each sheet of lightweight material is fixed at one of said upper horizontal bars or at one of said optional additional horizontal frame bars, each of said sheets of lightweight material is allowed to move by pivoting or bending relative to the horizontal bar to which it is attached, and the remaining edges of said sheets of lightweight materials are not attached to any structural support; and
    gap control means to control the size of a variable gap between the bottom of said swinging windows and the frame of which it is a part;
    wherein said swinging windows stop said sheets of lightweight material from being blown to one side of said frames, said one side being on the same side of each frame relative to the direction of rotation of said vertical axis windmill; and
    wherein said swinging windows are movable toward said one side of said frame such that said variable gap allows part of the air to pass through in the downwind direction.

2. The vertical axis windmill of claim 1, wherein said gap control means comprises;
    a gap control rod for each of said frames, wherein the gap control rod is directly connected via a pivoting connection to each of the swinging windows in the frame such that all swinging windows in the frame move synchronously as the gap control rod is moved; and
    one or more electronically controlled actuators capable of moving the gap control rods.

3. The vertical axis windmill of claim 2, wherein one electronically controlled actuator is provided for each frame and causes all swinging windows in said frame to move synchronously.

4. The vertical axis windmill of claim 2, wherein a single electronically controlled actuator moves all gap control rods at once.

5. The vertical axis windmill of claim 2, further comprising a position encoder capable of measuring the position of said swinging windows, wherein said measured position is used to control said electronically controlled actuators.

6. The vertical axis windmill of claim 2, further comprising an anemometer to measure wind speed, wherein said measured wind speed is used to control said electronically controlled actuators.

7. The vertical axis windmill of claim 2, further comprising a wind direction sensor, wherein the measured wind direction is used to select a subset of said electronically controlled actuators to be activated.

8. The vertical axis windmill of claim 2, further comprising an electrical power output sensor, wherein the measured electrical power output is used to control said electronically controlled actuators.

9. The vertical axis windmill of claim 2, further comprising a spring attached to each gap control rod such that said spring is extended or compressed only when wind speed exceeds a preset threshold.

10. The vertical axis windmill of claim 2, further comprising an additional safety mechanism comprising;
    a strong spring in tension or compression attached to a gap control rod, and
    a wind-speed-sensitive release mechanism;
    wherein said wind-speed-sensitive release mechanism is triggered when dangerous wind speeds are reached, and wherein said strong spring fully opens the swinging windows attached to said gap control rod.

11. The vertical axis windmill of claim 1, wherein said gap control means comprises;
    a gap control rod for each of said frames, wherein the gap control rod is directly connected via a pivoting connection to each of the swinging windows in the frame such that all swinging windows in the frame move synchronously as the gap control rod is moved; and
    a spring attached to each gap control rod such that said spring is extended or compressed only when wind speed exceeds a preset threshold.

12. The vertical axis windmill of claim 1, wherein said gap control means comprises;
    electronically controlled actuators capable of moving each of said swinging windows independently.

* * * * *